(12) United States Patent
Gehlsen et al.

(10) Patent No.: US 6,623,674 B1
(45) Date of Patent: Sep. 23, 2003

(54) REDUCED DENSITY FOAM ARTICLES AND PROCESS FOR MAKING

(75) Inventors: Mark David Gehlsen, Eagan, MN (US); David Loren Vall, Woodbury, MN (US); Bonnie Weiskopf Albrecht, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 213 days.

(21) Appl. No.: 09/714,408

(22) Filed: Nov. 16, 2000

(51) Int. Cl.⁷ .............................................. B29C 44/06
(52) U.S. Cl. ...................... 264/45.5; 156/79; 264/46.4; 264/50; 264/54
(58) Field of Search ........................... 264/45.5, 50, 54, 264/46.4; 156/79

(56) References Cited

U.S. PATENT DOCUMENTS

| | | |
|---|---|---|
| 3,227,664 A | 1/1966 | Blades et al. |
| 3,311,681 A | 3/1967 | Cherney et al. |
| 3,479,425 A | 11/1969 | Lefevre et al. |
| 3,485,912 A | 12/1969 | Schrenk et al. |
| 3,557,265 A | 1/1971 | Chisholm et al. |
| 3,565,985 A | 2/1971 | Schrenk |
| 3,670,059 A | 6/1972 | Winstead |
| 3,706,679 A * | 12/1972 | Hopton et al. ................. 264/54 |
| 3,782,870 A | 1/1974 | Schippers |
| 3,803,274 A | 4/1974 | Nakashima et al. |
| 3,857,914 A * | 12/1974 | Aishima et al. ............ 264/45.5 |
| 3,884,606 A | 5/1975 | Schrenk |
| 3,956,438 A | 5/1976 | Schippers |
| 4,038,350 A | 7/1977 | Jaques |
| 4,049,768 A | 9/1977 | Luthra |
| 4,107,247 A | 8/1978 | Dukess |
| 4,206,165 A | 6/1980 | Dukess |
| 4,221,624 A | 9/1980 | Eslinger et al. |
| 4,473,665 A | 9/1984 | Martini-Vvedensky et al. |
| 4,479,914 A * | 10/1984 | Baumrucker ................ 264/45.5 |
| 4,518,557 A | 5/1985 | Wecker |
| 4,522,675 A | 6/1985 | Sharps, Jr. |
| 4,533,578 A | 8/1985 | Boyd et al. |
| 4,585,679 A | 4/1986 | Karabedian |
| 4,714,735 A | 12/1987 | Hodgson, Jr. et al. |
| 4,746,477 A | 5/1988 | Wecker et al. |
| 4,747,983 A | 5/1988 | Colombo |
| 4,761,256 A | 8/1988 | Hardenbrook et al. |
| 5,055,495 A * | 10/1991 | Croce et al. ................... 521/85 |
| 5,160,784 A | 11/1992 | Shmidt et al. |
| 5,250,577 A | 10/1993 | Welsh |
| 5,476,712 A | 12/1995 | Hartman et al. |
| 5,705,111 A | 1/1998 | Blemberg et al. |
| 5,725,814 A | 3/1998 | Harris |
| 5,753,717 A | 5/1998 | Sanyasi |
| 5,800,903 A | 9/1998 | Wood et al. |
| 5,824,400 A | 10/1998 | Petrakis et al. |

FOREIGN PATENT DOCUMENTS

GB 998180 7/1965

* cited by examiner

Primary Examiner—Allan R. Kuhns
(74) Attorney, Agent, or Firm—Melanie G. Gover

(57) ABSTRACT

The invention discloses reduced density foams and methods of making the foams by applying or creating a nonfoaming barrier layer on a foamable layer, which barrier layer inhibits the escape of fugitive gases during the foaming process.

13 Claims, 5 Drawing Sheets

US 6,623,674 B1

REDUCED DENSITY FOAM ARTICLES AND PROCESS FOR MAKING

TECHNICAL FIELD

This invention relates to reduced density foam articles and methods of making same.

BACKGROUND

Methods for producing reduced density thermoplastic foam articles often employ flammable hydrocarbon gases as a physical blowing agent or employ complicated and costly crosslinking technologies. Nonvolatile gases such as carbon dioxide ($CO_2$) and nitrogen are generally not preferred as a blowing agent for thermoplastics due to their low solubility in the polymer.

SUMMARY OF INVENTION

The present invention provides reduced density foam articles These articles can be made with environmentally-friendly gases.

In one aspect of the present invention, an unfoamed barrier layer on a foam layer is employed to produce reduced density foam articles. It is believed that incorporating an unfoamed layer onto a major surface of a layer of foamable material acts as a barrier and dramatically changes the diffusional characteristics of a fugitive gas in the foamable material. This provides the ability to foam materials that may otherwise be difficult to foam.

One aspect of the invention provides a method of making a multilayer reduced density foamed article comprising:

(1) mixing at least one thermoplastic polymer and at least one blowing agent that is, or that produces, a fugitive gas to form a foamable melt mixture, (2) shaping the melt mixture such that it has at least one major surface, (3) affixing or creating a barrier layer of nonfoaming material on one or more of said major surfaces, wherein the barrier layer inhibits diffusion of the fugitive gas out of the foamable melt mixture, and (4) causing the melt mixture to foam.

Another aspect of the invention provides a foam article comprising a foam layer with a barrier layer on at least one major surface of the foam layer wherein the foam layer of the article has a lower density than a foam layer of a similar article without a barrier layer.

Another aspect of the invention provides a foam article comprising a foam layer with a barrier layer on at least one major surface wherein the article has a density lower than that of a foam article without a barrier layer.

Another aspect of the invention provides a foam article comprising at least four layers wherein the article comprises at least one foam layer between two unfoamed layers and wherein the article has a density lower than a similar article without unfoamed layers.

Another aspect of the invention provides a method of producing a reduced density foam article comprising:

1) mixing at least one thermoplastic polymer and at least one blowing agent that is, or that produces, a fugitive gas to form a foamable mixture, 2) shaping the melt mixture such that it has at least one major surface, 3) affixing or creating a barrier layer of nonfoaming material on one or more of said major surfaces of the melt mixture wherein the composition and thickness of the barrier layer cause it to inhibit gas diffusion such that the time it takes for the fugitive gas to diffuse out of the melt mixture into the atmosphere is substantially greater than the time it takes for the fugitive gas to nucleate and expand, and 4) causing the melt mixture to foam.

Another aspect of the invention provides a method of varying the density of a foam article comprising:

1) varying the amount of fugitive gas in a foamable polymer melt mixture, and 2) during the shaping stage of making a foam article, varying one or both of the thickness and composition of a non-foaming barrier layer applied to or created on at least one major surface of the shaped foamable melt mixture to control the difference between diffusion time and foaming time.

Various aspects of the invention employ carbon dioxide as the fugitive gas. Carbon dioxide may be provided as carbon dioxide in the form of a physical blowing and/or carbon dioxide produced by a chemical blowing agent. Other gases are also suitable for use as fugitive gases, as is explained further in the Detailed Description section.

The methods of the invention are especially effective when high concentrations of fugitive gas are used in combination with an unfoamed barrier layer. The fact that incorporating unfoamed barrier layers on a foam layer causes a reduction in foam density is counterintuitive. Intuitively, one would expect the unfoamed barrier layers to increase the density of a foam article. However, it is believed that the presence of the barrier layers changes the gas diffusion characteristics of the fugitive gas, causing more of the gas to nucleate and grows cells in the polymer matrix as opposed to escaping from the polymer matrix of the melt mixture into the atmosphere.

One aspect of the invention discloses a technique whereby as the thickness of the unfoamed barrier layer increases for a given combination of polymer matrix and fugitive gas concentration and type, the density of the foam structure decreases. In some instances, the decrease is about 200%.

As used in the present application:

"fugitive gas" means a gas that has a propensity to diffuse out of a polymer into the atmosphere when exposed to atmospheric pressure, preferably a gas having a vapor pressure of greater than 0.689 MPa at 0° C.

An advantage of at least one embodiment of the present invention is that using unfoamed barrier layers to control the diffusional properties of fugitive gas(es) alleviates the need to use flammable hydrocarbons or complicated cross-linking technology to produce high performance foams.

Another advantage of at least one embodiment of the present invention is that it enables low cost production of thermoplastic foams such as polyolefin foams using gases such as $CO_2$ as the sole blowing agent.

Other features and advantages of the invention will be apparent from the following figures, detailed description, and claims.

Figure 1:
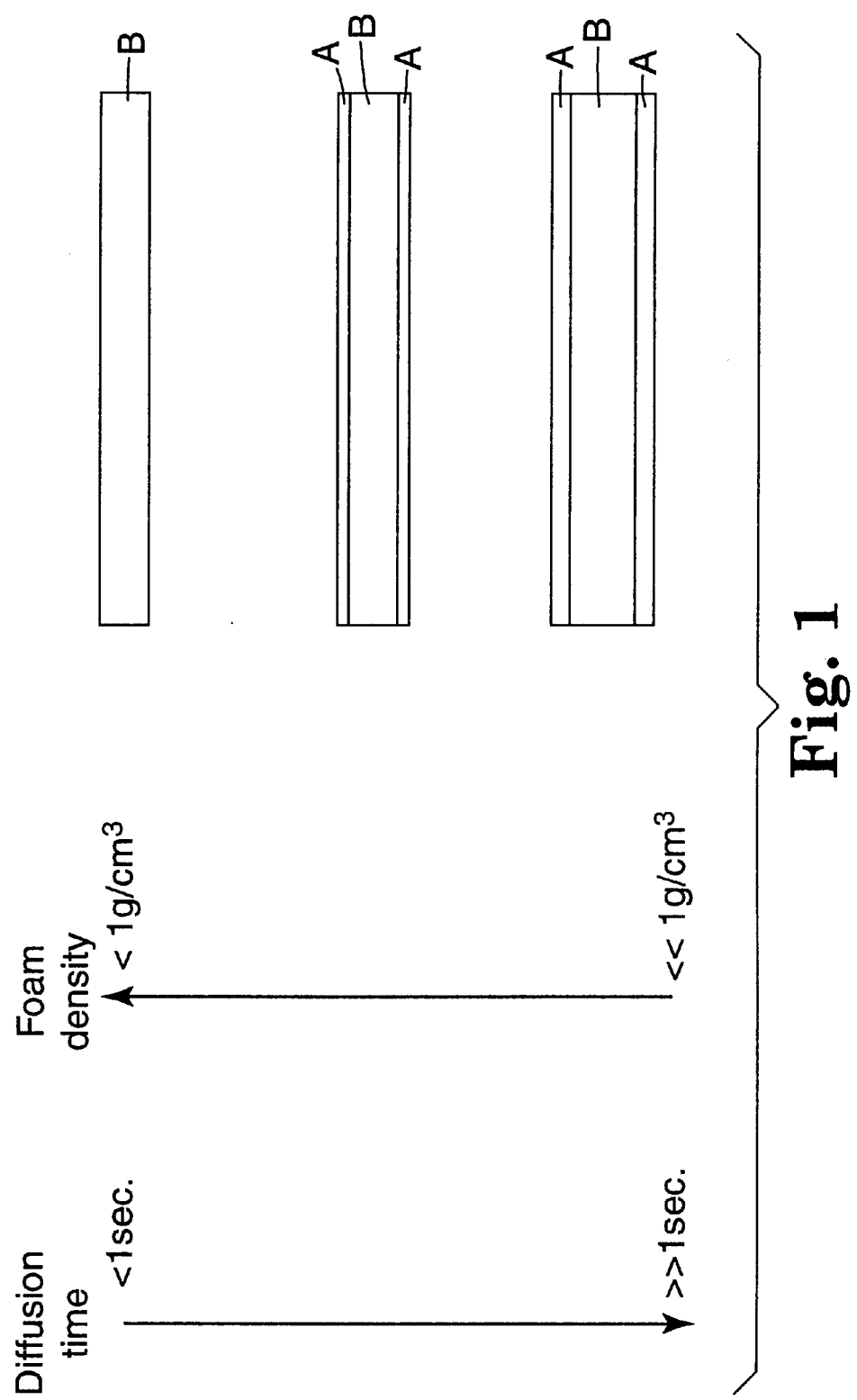
FIG. 1 shows an illustration of how increasing unfoamed barrier layer (A layer) thickness in the present invention can decrease foam density for an ABA structure wherein B is a foamed layer.

The present invention is susceptible to various modifications and alternative forms, and specifics thereof have been shown by way of example in the drawings and will be described in detail. It should be understood, however, that the intention is not to limit the invention to the particular embodiments described. On the contrary, the intention is to cover all modifications, equivalents, and alternatives failing within the spirit and scope of the invention as described by the following detailed description and as defined by the appended claims.

DETAILED DESCRIPTION

The present invention discloses a method for reducing the density of a foam article (and the foam layer(s) in the foam articles) while maintaining the mechanical properties of the foam article. This is achieved in part by applying or creating an unfoamed barrier layer on one or more major surfaces of a foamable material. Barrier layers may be the outer, i.e., "skin," layer or may be an interior layer in a multi-layer structure having more than one foam layer. The resulting foam article may be in various shapes such as rods, fibers, sheets, etc.

Reducing foam density may be achieved by controlling and coordinating the type of polymer used for the foamable layer, the type and amount of fugitive gas in the foamable layer, and the type of material and thickness of the barrier layer.

To achieve polymer foaming, a gaseous component must solubilize in the polymer. When the polymer-gas mixture is exposed to a reduced pressure, the gas nucleates, further diffuses from the polymer matrix to nucleation sites, and expands to form cells. The resulting material may then be brought into contact with a cooled surface, typically a chilled casting drum that stabilizes and solidifies the foamed article. The resulting material comprises a polymer foam article comprising gas voids inside a polymer matrix. To obtain such a structure, the compatibility of the gas and polymer must be considered. If the gas is highly soluble in the polymer, it may remain in the polymer instead of nucleating and forming cells. Conversely, if the gas is not sufficiently soluble in the polymer, the gas may migrate out of the polymer into the atmosphere without substantially contributing to the formation of cells. Optimally, the gas will have high solubility in the polymer when the gas is in a non-gaseous phase (e.g., under pressurized conditions), and low solubility in the polymer when it is in a gaseous phase. Under these conditions, substantially all of the gas should form cells with minimal losses of gas to the atmosphere prior to solidification of the foam article. A mass balance on the system would be as follows:

Total gas added=gas in cells+gas in cell walls+gas lost to environment

Polymer foam density can be deduced from this gas material balance. Making a reduced density foam article requires optimizing the amount of gas that expands in the polymer. In other words, maximizing the amount of gas residing in the cells will optimize the reduction in foam density. Accordingly, gas and polymer combinations may be selected to minimize the amount of gas remaining in the cell walls and lost to the environment and to maximize the amount of gas that forms and expands cells.

In the past, gases such as chlorofluorocarbons and hydrocarbons were used to produce foams. These materials are typically highly soluble in polymers, which minimizes the amount of gas lost to the atmosphere. Foaming systems that used chlorofluorocarbons were formulated so that upon exiting an extruder, the gas would slowly nucleate and expand cells. These systems were designed with gases having vapor pressures of less than 0.689 MPa (100 psia) (at 0° C.) and boiling points between −20° C. and 20° C. For these systems, the diffusion coefficients (i.e., rates at which the gas diffuses from the polymer) are about $10^{-7}$ to $10^{-8}$ $cm^2$/sec (at 200° C.) as shown in Crank, J. and Park, G. S., (eds) "Diffusion in Polymers," Academic Press, London, 1968.

Environmentally-friendly gases such as carbon dioxide, air, nitrogen, helium, etc. are more difficult to use in foaming processes because they are less soluble in polymers and diffuse into the atmosphere quickly. Environmentally-friendly gases typically have vapor pressures that are much greater than 0.689 MPa (100 psia) (at 0° C.). For example, the vapor pressure of carbon dioxide is 2.07 MPa (300 psia). With a high vapor pressure gas, reduction of pressure at the extruder die exit causes the gas to vaporize quickly and causes pressure in the cells to increase rapidly. The difference in pressure between the cell interior and atmosphere acts as a driving force that causes the carbon dioxide to readily diffuse from the foam into the atmosphere. The diffusion coefficients for $CO_2$ are about $10^{-5}$ to $10^{-6}$ $cm^2/sec$ (at 200° C.) as shown in Crank, J. and Park, G. S., (eds) "Diffusion in Polymers," Academic Press, London, 1968, an order of magnitude higher than for CFCs. Because the environmentally-friendly gases prefer to migrate out of the polymer prior to cell fomation, these "fugitive" gases generally do not effectively expand in the polymer to make a foam.

The present invention takes advantage of the propensity of fugitive gases to vaporize and form cells within a polymer matrix, while counteracting the tendency of the fugitive gases to diffuse from the polymer matrix into the atmosphere. The present invention uses an unfoamed barrier layer adjacent to a gas-containing polymer layer to decrease the diffusion rate of the gas out of the polymer matrix and to increase the gas's formation and expansion of cells. This technique effectively minimizes the amount of gas escaping into the atmosphere so that more gas is used to form and expand cells in the polymer. The fugitive gas being used may have some solubility in the thermoplastic being foamed. However, the present invention allows foams to be successfully made with polymers and gases that are not particularly compatible, e.g., polyolefins and $CO_2$.

The inventors have found that non-foaming barrier layer materials and thicknesses can be chosen such that the time it takes the fugitive gas to diffuse out of the polymer matrix and through the barrier layer (diffusion time) is greater than the time it takes the gas to form and expand cells in the polymer matrix (foaming time). The diffusion characteristics of gases in polymers are known and are described in more detail in Crank, J. and Park, G. S. (eds), "Diffusion in Polymers", Academic Press, London, 1968. The following equation describes gas diffusion in a polymer, $$\frac{M_t}{M_\infty} = 1 - \frac{4}{\sqrt{\pi}} \sqrt{\frac{D_t}{l^2}} \quad (1)$$

where $M_t$ is the amount of gas in a polymer at time t, $M_\infty$ is the amount of gas in a polymer at saturation, D is the diffusion coefficient, and 1 is the sample thickness. This expression can be simplified to capture the important scaling relationship of the time required for a gas molecule to diffuse a length, 1, $$t \approx \frac{l^2}{D} \quad (2)$$

where t is time, 1 is the diffusion length, and D is the diffusion coefficient. The diffusion time of a gas molecule in a polymer depends on the polymer-gas combination, which determines the diffusion coefficient (D), and the diffusion length (1). In the present invention, each polymer-gas-length combination must be optimized to control the diffusion of gas for a given length, i.e., thickness, of polymer.

The diffusion coefficients for gases in various polymers are known. See Durrill, P. L. and Griskey, R. G., AIChE Journal, 12(6); 1147, (1966): Durrill, P. L. and Griskey, R. G., AIChE Journal, 15(1), 106;, (1969); Bonner, D. C., Polym. Eng. Sci., 17(2), 65, (1977); Wissinger, R. G., and Paulaitis, M. E., J. Polym. Sci.:Polym. Phys., 25, 2497, (1987); Shim, J. J. and Johnston, K. P., AIChE Journal, 35(7), 1097, (1989); Kramer, E. J. et al., J. Polym. Sci.: Polym. Phys., 20, 1371, (1982); Koros, W. J. and Paul, D. R., Polym. Eng. Sci., 20(1), 14, (1980); Chiou, J. S., Barlow, J. W., and Paul, D. R., J. Appl. Polym. Sci., 30, 2633, (1985); and Crank, J. and Park, G. S. (eds); "Diffusion in Polymers", Academic Press, London, 1968. For example, the value of D for carbon dioxide in polyethylene is about $10^{-6}$ $cm^2/sec$. Therefore, addition of a 25 µm low density polyethylene (LDPE) layer on a carbon dioxide/polyethylene foam would result in a diffusion time through the LDPE barrier layer of about 6 seconds. A 51 µm polyethylene barrier layer would result in a diffusion time of about 25 seconds. Because the time required to nucleate and expand gas voids in the polyethylene polymer is less than one second, these barrier layers hinder gas diffusion into the atmosphere, thereby more effectively using the gas to form a foam.

As an illustration, the data from the inventors' experiments show that when LDPE barrier layers were added to an LDPE foamable layer in conjunction with a $CO_2$ fugitive gas concentration of greater than about 65 volume % in the LDPE foamable layer, the density of the foam article decreased compared to LDPE foam articles in which the foam layer was made with less fugitive gas or the foam article was made with thinner barrier layers. A similarly unexpected decrease in density was observed when the barrier layers were made with pressure sensitive adhesives. The inventors also found that foam article density further decreased with an increase in barrier layer thickness. However, below a $CO_2$ fugitive gas concentration of about 65 volume % in LDPE, the inventors found that density increased as expected when barrier layer thicknesses were increased. This was expected because of additive effect of the higher density unfoamed layers to the overall density of the foam article.

As the foregoing indicates, the type and amount of fugitive gas mixed into the polymer matrix, the composition of the matrix, and the composition and thickness of the barrier layer(s) should all be considered in decreasing density. Selection of these variables will influence diffusion time and foam density. One of skill in the art would be able to make judicious sections without undue experimentation.

Figure 4:
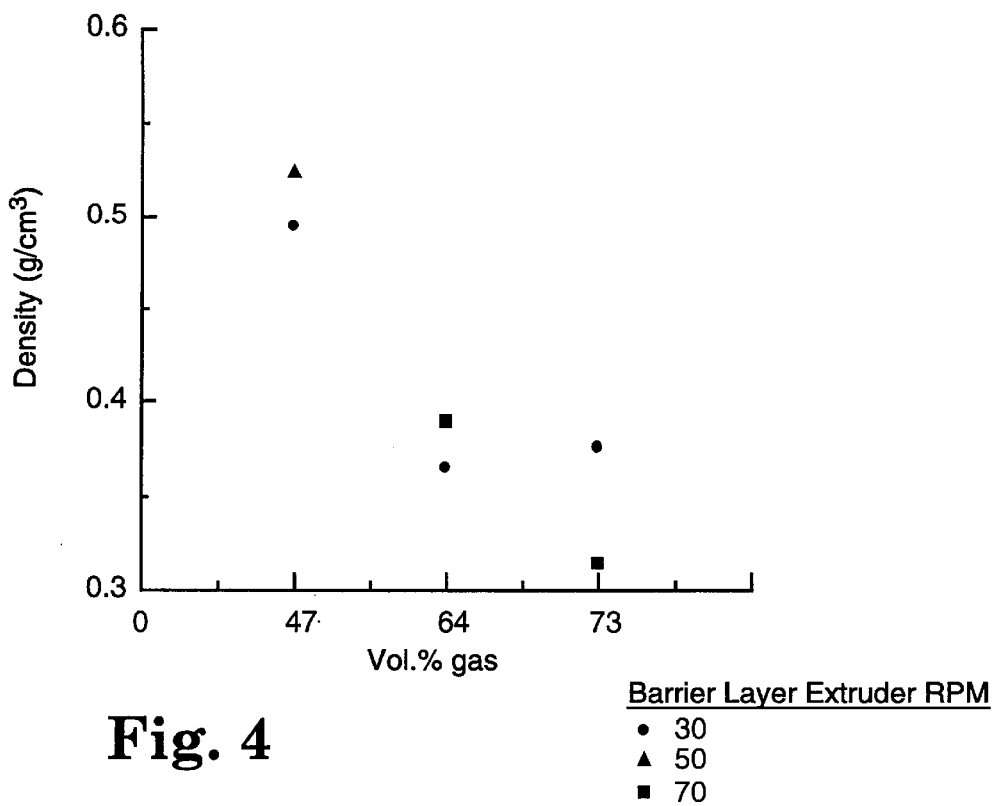
FIG. 4 shows foam density as a function of fugitive gas concentration for ABA foam articles having different barrier layer thicknesses wherein the barrier and foam layers each comprise a low density polyethylene. A difference in barrier layer thickness is indicated by the different revolutions per minute (RPM) of the barrier layer extruder screw.

The data in FIG. 4 show that for foam articles having a low density polyethylene (LDPE) foam layer and $CO_2$ fugitive gas concentrations below about 65 vol % (e.g., about 47 vol. % and about 64 vol. %), increasing an LDPE barrier layer thickness (by increasing the RPM of the barrier layer extruder screw) increased foam density. In contrast, for the same type of foam having a fugitive gas concentration above about 65 vol % (e.g., about 73 vol. %), increasing an LDPE barrier layer thickness (by increasing the RPM of the barrier layer extruder screw) decreased foam density. All the samples in FIG. 4 were collected at the same casting speed (3 m/min).

Foam layers made per the present invention generally also have reduced densities as compared to similarly made foam layers having no barrier layers. For example, the density of a single layer polyethylene foam article with no barrier layers, made with a $CO_2$ fugitive gas concentration of 90 vol. %, was found to be 0.50 $g/cm^3$. When the same foam layer was made with unfoamed polyethylene barrier layers extruded from an extruder with a screw operating at 70 RPM, the article density decreased to about 0.24 $g/cm^3$. It was also found that the tensile properties of the two articles were similar even though the foam article with barrier layers used less than half the material of the single layer foam article.

Figure 5:
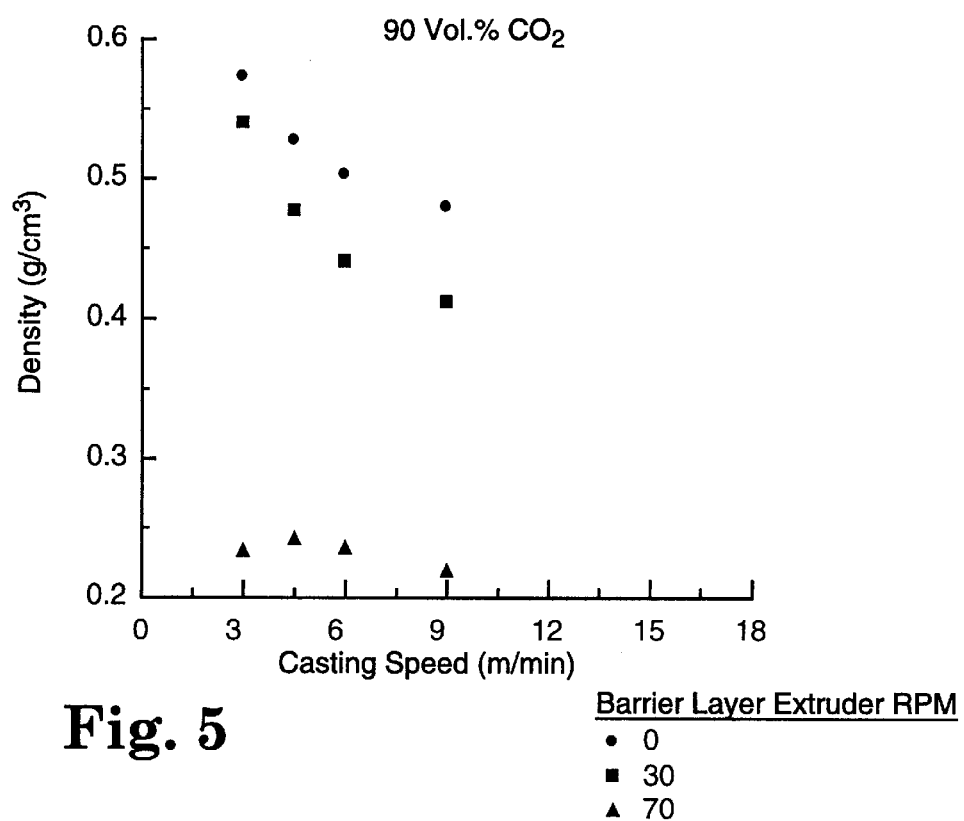
FIG. 5 shows foam density as a function of casting speed for ABA foam articles having different barrier layer thicknesses wherein the barrier and foam layers each comprise a low density polyethylene. The foam layer was made using a fugitive gas concentration of 90 vol % $CO_2$ at STP. A difference in barrier layer thickness is indicated by the different revolutions per minute (RPM) of the barrier layer extruder screw.

Pressure sensitive adhesives may also be used in barrier layers. As shown by FIG. 5, for an LDPE foam layer made with 90 vol. % $CO_2$ fugitive gas, as the thickness of an unfoamed pressure sensitive adhesive (KRATON) barrier layer increased, the density of the foam article decreased dramatically. FIG. 5 further shows that the combination of 90 vol. % fugitive gas concentration and a thick barrier layer (produced by an extruder screw RPM of 70) provides a foam article having a density independent of casting speed. The density for this foam was below 0.27 g/cm$^3$ and substantially constant over a range of casting speeds (3 to 9 m/min).

Figure 6:
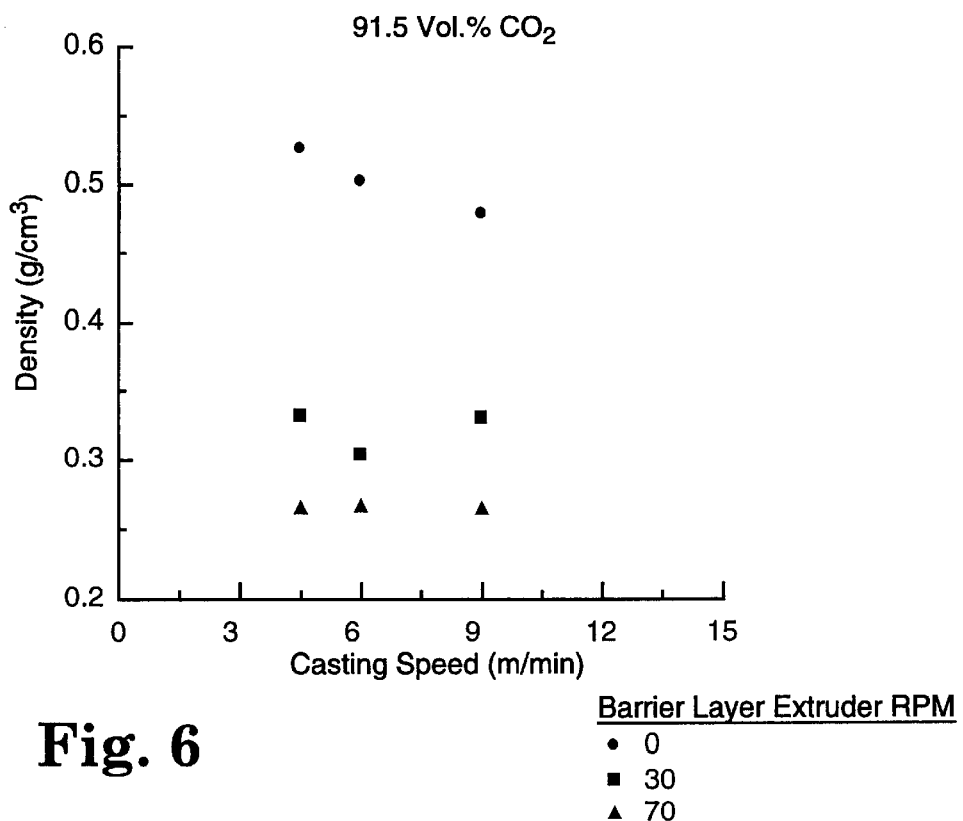
FIG. 6 shows foam density as a function of casting speed for ABA foam articles having different barrier layer thicknesses wherein the barrier layer comprises an unfoamed pressure sensitive adhesive and the foam layer comprised a low density polyethylene. The foam layers were made using a fugitive gas concentration of 91.5 vol. % $CO_2$ at STP. A difference in barrier layer thickness is indicated by the different revolutions per minute (RPM) of the barrier layer extruder screw.

The data in FIG. 6 were obtained from LDPE foam articles made with pressure sensitive adhesive (KRATON) barrier layers. The foam layers of the articles were made with 91.6 vol % $CO_2$ fugitive gas concentrations. Similar to the data in FIG. 5, FIG. 6 shows that as the barrier layer thickness increased, foam article density decreased.

The mechanical, e.g., tensile, properties of polymer foams depend on several variables including polymeric material, density, cell size and shape, and pressure inside the foam cells. In general, the modulus of a foam can be described by the following equation, $$\frac{S_f}{S_o} = \Phi^2 \left(\frac{\rho_f}{\rho_o}\right)^2 + (1-\Phi)\left(\frac{\rho_f}{\rho_o}\right) + \frac{p_o(1-2v_f)}{S_o(1-\rho_f/\rho_o)} \quad (3)$$

where $S_f$, $S_o$ are the mechanical properties of the foam and the original material, respectively. $\Phi$ is the fraction of material in the cell edges, $\rho_f$, $\rho_o$ are the densities of the foam and polymer, respectively, $p_o$ is the pressure inside the foam cells, and $v_f$ is the polymer material Poisson's ratio. The first two terms on the right hand side of (3) are related to the stress distribution on the cell edges and cell walls, respectively. The $p_o$ term is the contribution due to the pressure of the gas inside the cells. Most of the foams produced with atmospheric gases possess a small $p_o$ term because the internal cell pressure is equivalent to atmospheric pressure. In addition, since most foams are a combination of open and closed cells, $\Phi$ is difficult to characterize. As a result, (3) can be simplified to the following expression, $$\frac{S_f}{S_o} = \left(\frac{\rho_f}{\rho_o}\right)^n \quad (4)$$

where n is a power law exponent that is dependent on the combination of open and closed cells in the polymeric foam. This equation can be used in a very general sense and the exponent can be communicated easily, for example if polymer foams are made when n equals 1, the strength of the material decreases linearly with density reduction. As n approaches 2, the mechanical properties decrease significantly faster as the density decreases.

Figure 7:
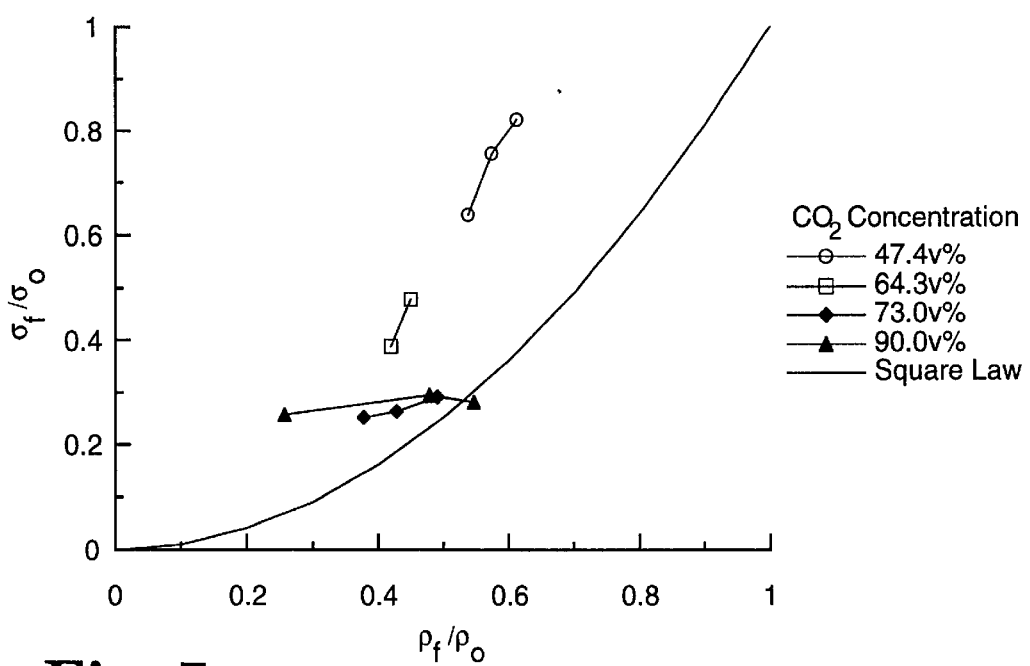
FIG. 7 shows normalized tensile at break data as a function of normalized density data for a variety of low density polyethylene (LDPE) foam articles having unfoamed barrier layers (of the same thickness) as compared to data representing comparative foam articles.

FIG. 7 shows the mechanical properties of some materials of the invention and comparative materials. At fugitive gas concentrations of less than 64 vol. % the slope of (Sf/So)/(Pf/Po) was greater than 1 whereas at concentrations of greater than 64 vol. % the slope was less than 0.5. These examples demonstrate that at high fugitive gas concentrations the tensile properties of the resulting foam articles are significantly independent of density.

Another surprising observation from FIG. 7 is that at high concentrations, e.g., greater than about 65 vol. %, of fugitive gas, tensile properties of the same polymer matrix material having the same barrier layer thicknesses remained nearly constant as the densities of the foam articles decreased. This shows that reduced density foam articles having the same tensile properties as higher density foam articles (but using less material) could be produced. This indicates that it is possible to manufacture foam articles having barrier layers using 50% less material than a foam article with no barrier layers without sacrificing mechanical properties.

Process

The foam articles of the present invention may be produced in any manner so long as at least one foam layer is adjacent to an unfoamed barrier layer that will inhibit the diffusion of fugitive gas from the foamable layer. The unfoamed barrier layer may be on one or more major surfaces of a foam layer, i.e., as a skin, or may be sandwiched between foam layers when a multiple-layer foam article is produced.

The foam articles of the present invention may be made by a pressurized melt processing method such as an extrusion method. The extruder may be a tandem system, a single screw extruder, a twin screw extruder, etc. The extruder may be equipped with multilayer annular dies, flat film dies and feedblocks, multi-layer feedblocks such as those disclosed in U.S. Pat. No. 4,908,278 (Bland et al.), multi-vaned or multi-manifold dies such as a 3-layer vane die available from Cloeren, Orange, Tex.

A foamable layer may also be made by combining a chemical blowing agent and polymer at a temperature below the decomposition temperature of the chemical blowing agent then later foamed. The barrier layer can also be applied by lamination to a foamable layer, which is subsequently foamed.

One method of producing the foam material of the invention is by using an extruder with a two (or more) layer feedblock. In this case, the foamable mixture is extruded as the B layer in an ABA construction with the barrier layers being extruded as the A layers. The ABA construction exits an extruder die and upon exposure to reduced pressure, the fugitive gas immediately nucleates and forms cells within the polymer to create a foam article. The resulting foam article is then deposited onto a temperature-controlled casting drum. The casting drum speed (i.e., as produced by the drum RPM) can affect the overall thickness of the foam article. As the casting roll speed increases, the overall thickness of the foam article (including barrier and foam layers) can decrease. However, the barrier layer thickness at the die exit, which is where foaming occurs, is the diffusion length, l, for the system. As the foam article is stretched and quenched on the casting drum, the barrier layer thickness may decrease until the foam article solidifies. In other words, it is the barrier layer diffusion length (i.e., thickness) at the die exit that is the important factor in controlling the diffusion of the fugitive gas.

A surface barrier layer on a foamable layer may also be produced by submerging the exit of an extruder die under water. In this case, as the foamable material is extruded, the water can cool the outer portion of the extruded material causing it to form an unfoamed skin layer. This outer unfoamed layer can inhibit diffusion of the fugitive gas from the interior foamable material thereby facilitating the foaming process.

Foamable Materials

Polymer materials that may be used for the foamable layer matrix of the present invention include any thermoplastic material. Suitable materials include, e.g., thermoplastics that are amorphous, semi-crystalline, and pressure sensitive adhesives. Suitable materials may comprise blends of two or more polymers.

The polymers may be homopolymers or copolymers, including random and block copolymers. It may be desirable to use two or more miscible (or immiscible) polymers having different compositions to achieve unique foam properties. A wide range of foam physical properties can be obtained by selectively choosing the polymer component types and concentrations. A particular polymer may be selected based upon the desired properties of a final foam-containing article.

Suitable amorphous polymers include, e.g., polystyrenes, polycarbonates, polyacrylics, polymethacrylics, elastomers, such as styrenic block copolymers, e.g., styrene-isoprene-styrene (SIS), styrene-ethylene/butylene-styrene block copolymers (SEBS); polybutadiene, polyisoprene, polychloroprene, random and block copolymers of styrene and dienes (e.g., styrene-butadiene rubber (SBR)), ethylene-propylene-diene monomer rubber, natural rubber, ethylene propylene rubber, polyethylene-terephthalate (PETG). Other examples of amorphous polymers include, e.g., polystyrene-polyethylene copolymers, polyvinylcyclohexane, polyacrylonitrile, polyvinyl chloride, thermoplastic polyurethanes, aromatic epoxies, amorphous polyesters, amorphous polyamides, acrylonitrile-butadiene-styrene (ABS) copolymers, polyphenylene oxide alloys, high impact polystyrene, polystyrene copolymers, polymethylmethacrylate (PMMA), fluorinated elastomers, polydimethyl siloxane, polyetherimides, amorphous fluoropolymers, amorphous polyolefins, polyphenylene oxide, polyphenylene oxide-polystyrene alloys, copolymers containing at least one amorphous component, and mixtures thereof.

Suitable semi-crystalline materials include polyethylene, polypropylene, polymethylpentene, polyisobutylene, polyolefin copolymers, Nylon 6, Nylon 66, polyester, polyester copolymers, fluoropolymers, poly vinyl acetate, poly vinyl alcohol, poly ethylene oxide, functionalized polyolefins, ethylene vinyl acetate copolymers, metal neutralized polyolefin ionomers available under the trade designation SURLYN from E.I. DuPont de Nemours, Wilmington, Del., polyvinylidene fluoride, polytetrafluoroethylene, polyformaldehyde, polyvinyl butyral, and copolymers having at least one semi-crystalline compound.

Suitable pressure sensitive adhesive (PSA) polymers can be adhesive polymers (i.e., polymers that are inherently adhesive), or polymers that are not inherently adhesive but are capable of forming adhesive compositions when compounded with tackifiers. Tackifiers that may be used include, for example, those listed in the additives section below. Pressure Sensitive Adhesives can be quantitatively described using the "Dahlquist criteria" which maintains that the elastic modulus of these materials is less than $10^6$ dynes/cm$^2$ at room temperature. See Pocius, A. V., *Adhesion & Adhesives: An Introduction*, Hanser Publishers, New York, N.Y., First Edition, 1997. Examples of suitable PSA polymers (as long as they have an appropriate Dahlquist numbers, either inherently or after being tackified) include acrylics, acrylic copolymers (e.g., isooctylacrylate-acrylic acid), amorphous poly-alpha-olefins (e.g., polyoctene, polyhexene, and atactic polypropylene), block copolymer-based adhesives, natural and synthetic rubbers, styrene-butadiene rubber (SBR), silicone adhesives, ethylene-vinyl acetate, siloxanes, and epoxy-containing structural adhesive blends (e.g., epoxy-acrylate and epoxy-polyester blends), acrylic copolymers such as those described in U.S. Pat. No. 5,804,610, incorporated by reference, tackified styrenic block copolymers, polyolefin copolymers, polyureas, polyurethanes, vinyl ethers, polyisobutylene/butyl rubber, ethylene-propylene-diene rubber (EPDM), as well as pressure sensitive adhesives disclosed in copending application Ser. No. 09/091,683, incorporated by reference, and mixtures of any of the foregoing pressure sensitive adhesives.

Immiscible thermoplastic polymer blends may also be used for the polymer matrices of the foams of this invention as long as the polymeric materials are suitable for melt extrusion processing and provide appropriate diffusion characteristics with the fugitive gas being used. It may be desirable to blend two or more immiscible polymers having different compositions to achieve unique foam properties. A wide range of foam physical properties can be obtained by selectively choosing the blend component types and concentrations. A particular polymer may be selected based upon the desired properties of a final foam-containing article.

Any single component of a blend may comprise greater than zero, but less than 100 weight % of the foamable matrix. Suitable immiscible blends may comprise any two or more amorphous thermoplastic polymers, or semi-crystalline polymers. Pressure sensitive adhesives may also be used to form immiscible blend foams. Combinations of one or more immiscible PSAs with one or more immiscible non-PSA may be used.

Blowing Agents

Blowing agents suitable for the present invention may be physical blowing agents, which are typically the same material as the fugitive gas, e.g., $CO_2$, or a chemical blowing agent, which will produces the fugitive gas. More than one physical or chemical blowing agent may be used and physical and chemical blowing agents may be used together.

Physical blowing agents useful in the present invention include any naturally occurring atmospheric material which is a vapor at the temperature and pressure at which the foam exits the die. The physical blowing agent may be introduced, i.e., injected into the polymeric material as a gas, a supercritical fluid, or liquid, preferably as a supercritical fluid or liquid, most preferably as a liquid. The physical blowing agents used will depend on the properties sought in the resulting foam articles. Other factors considered in choosing a blowing agent are its toxicity, vapor pressure profile, ease of handling, and solubility with regard to the polymeric materials used. Non-flammable, non-toxic, non-ozone depleting blowing are preferred because they are easier to use, e.g., fewer environmental and safety concerns, and are generally less soluble in thermoplastic polymers. Suitable physical blowing agents include, e.g., carbon dioxide, nitrogen, $SF_6$, nitrous oxide, perfluorinated fluids, such as $C_2F_6$, argon, helium, noble gases, such as xenon, air (nitrogen and oxygen blend), and blends of these materials.

Chemical blowing agents that may be used in the present invention include, e.g., a sodium bicarbonate and citric acid blend, dinitrosopentamethylenetetramine, p-toluenesulfonyl hydrazide, 4-4'-oxybis(benzenesulfonyl hydrazide, azodicarbonamide (1,1'-azobisformamide), p-toluenesulfonyl semicarbazide, 5-phenyltetrazole, 5-phenyltetrazole analogues, diisopropylhydrazodicarboxylate, 5-phenyl-3,6-dihydro-1,3,4-oxadiazin-2-one, and sodium borohydride.

Preferably, the blowing agents are, or produce, one or more fugitive gas(es) having a vapor pressure of greater than 0.689 MPa at 0° C.

Barrier Materials

Barrier layers may be added to the foamable layer by any method that creates a barrier to gas diffusion prior to the expansion of the gas in the foamable layer. Suitable methods of incorporating barrier layers include coextrusion methods. Alternatively, the outer portion of the foamable layer may be made into a skin layer, e.g., by cooling such that the outer layer solidifies before it can foam. Other methods, such as lamination and extrusion coating, may also be used to apply barrier layers. The barrier layers may be comprised of a variety of materials, e.g., thermoplastics, thermosets, foils, or anything else that inhibits or prevents diffusion of a particular fugitive gas from the foamable layer. A thermoplastic barrier material may be the same as, or different from, the foamable layer material. Suitable thermoplastic barrier layer materials include all of the materials listed for the foamable layer.

The inventors found that increasing the thickness of the barrier layers caused more fugitive gas to remain in the foamable layer and expand thereby causing the density of a foam article to significantly decrease. Thicker barrier layers also provide mechanical support to the resulting foam article.

Additives

The foamable melt mixture may also include additives. However, it should be noted that additives could change the properties of the melt mixture such that, upon exposure to a reduced pressure, the diffusion rate of the fugitive gas could increase or decrease over the rate of the same material without the additive. The effect of an additive could be easily determined through routine experimentation by one skilled in the art. Examples of suitable additives include tackifiers (e.g., rosin esters, terpenes, phenols, and aliphatic, aromatic, or mixtures of aliphatic and aromatic synthetic hydrocarbon resins), plasticizers (other than physical blowing agents), nucleating agents (e.g., talc, silicon, or $TiO_2$), pigments, dyes, reinforcing agents, solid fillers, hydrophobic or hydrophilic silica, calcium carbonate, toughening agents, flame retardants, antioxidants, finely ground polymeric particles (e.g., polyester, nylon, or polypropylene), expandable microspheres, glass beads, stabilizers (e.g., UV stabilizers), and combinations thereof.

EXAMPLES

This invention may be illustrated by way of the following examples, including the test methods used to evaluate and characterize the foam articles produced in the examples.

Test Methods

Foam Density (ASTM D792-86)

Foam article samples were cut into 12.5 mm×25.4 mm specimens and weighed on a high precision balance available as Model AG245 from Mettler-Toledo, Greifensee, Switzerland. The volume of each sample was obtained by measuring the mass of water displaced at room temperature (25° C.). Assuming the density of water at 25° C. to be 1 g/cm³, the volume of each sample was calculated using Archimede's principle. The density of the foam article was obtained by the quotient of the mass and volume. Accuracy of this measurement is ±0.005 g/cm³.

Gas Concentration

The gas concentration produced by the blowing agent was calculated for each sample on a volume percent basis. The gas concentration was based on the gas volume at Standard Temperature and Pressure (STP), i.e., 298 K, 1 atm, for a given volume of foamable melt mixture. The percent volume of gas, $V_g$, in the system can be calculated using the following expression:

$$V_g = \frac{\frac{(Q_{CBA} + Q_{PBA}) * RT}{M_w * P}}{\frac{Q_p}{\rho_p} + \frac{(Q_{CBA} + Q_{PBA}) * RT}{M_w * P}} * 100$$

where $Q_{CBA}$ is the mass flow rate of gas generated using a chemical blowing agent (CBA), $Q_{PBA}$ is the mass flowrate of gas (Physical Blowing Agent (PBA)) injected into the process, $M_w$ is the molar mass of the gas, R is the gas constant, T is temperature, P is pressure, $Q_p$ is the mass flowrate of polymer, and $\rho_p$ is the density of the polymer. For all the calculations reported in this application the gas volume was calculated at STP. The volume of gas generated by the CBA was calculated using the manufacturer's data information. For additional information on gas volume generated by various CBAs see *Encyclopedia of Polymer Science & Engineering*, "Blowing Agents", volume 2, p. 434–446, John Wiley & Sons, 1985.

Tensile Strength and Elongation

The foam article tensile and elongation properties, as defined in ASTM D638-95, were measured at room temperature using a testing device available as Model 55R1122, from Instron, Canton, Mass. The samples were first conditioned at 21° C. and 50% humidity for 5 days. The samples were then cut into 130 mm×12.5 mm specimens. The thickness of each specimen was measured using a digital linear gauge available as Model EG-233 from Ono Sokki, Tokyo, Japan, and recorded. The samples were tested using gauge lengths of 51 mm (2 in.) at a rate of 254 mm/min (10 in/min) until failure. The strength (σ) was measured as a function of elongation (ε). The maximum values of σ and ε are reported as $\sigma_{max}$ and $\epsilon_{max}$, respectively.

Tandem Single Screw Extrusion Process 10

Figure 8:
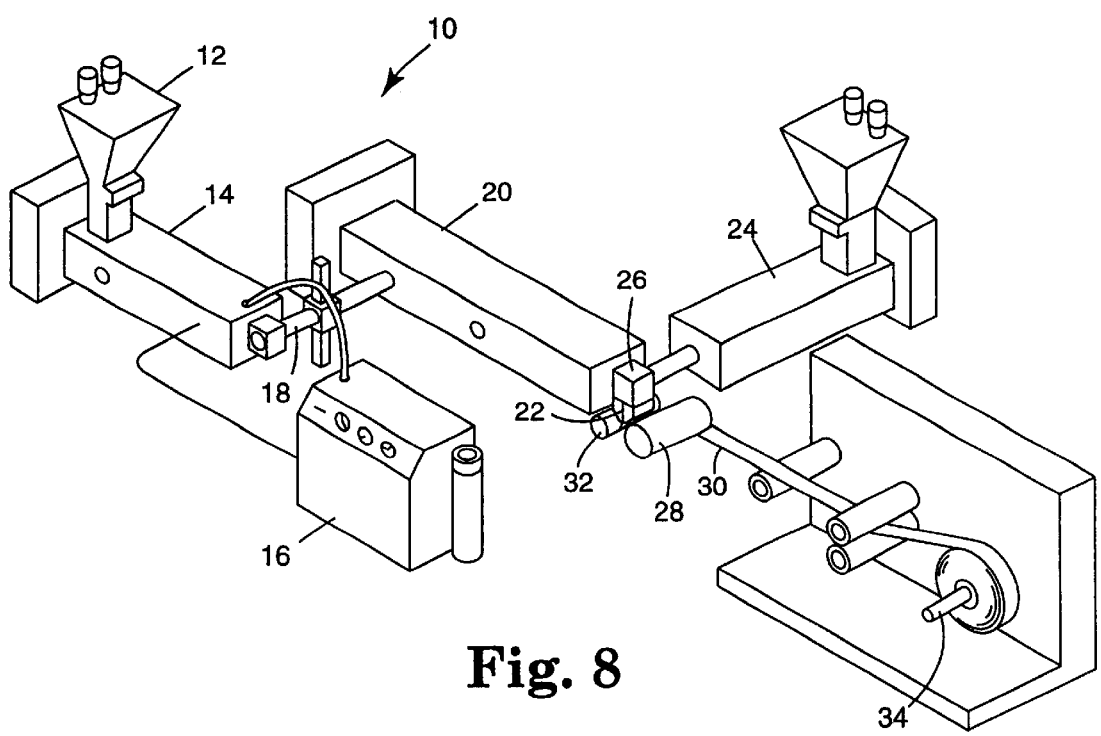
FIG. 8 shows an illustration of a tandem foam coextrusion apparatus that can be used to make some embodiments of foam articles of the present invention.

FIG. 8 illustrates a coextrusion process used to make an ABA foam article wherein the B layer was foamed and the A layers were not. To form the B layer, polymer pellets were fed into a gravimetric batch blender 12 having 4 zones available as Model ACW-T from ConAir-Franklin, Media, Pa., at a rate of about 10 to about 21 kg/hr. If a chemical blowing agent (CBA) was used, it was added in the first zone of the blender at a rate of between 2 and 6 parts per 100 parts of polymer. The blender fed the components to first single screw extruder 14, an NRM single screw extruder available from Davis-Standard, Pawcatuck, Conn. Extruder 14 had 6 barrel zones, a 64 mm (2.5 in.) diameter, a length to diameter ratio of 36:1 and a two-stage screw having a compression ratio of 3:1, available as Model PS-31 from Plastic Engineering Associates, Inc., Boca Raton, Fla. Extruder 14 was operated at 25 RPM with an increasing temperature profile from zone 1 to zone 6 of about 166 to about 232° C. and a temperature of about 216° C. in zones 5 and 6 to form a melt mixture. Temperature was set for each zone of extruder 14 to create increasing operating pressures from zone 1 to zone 4 of from about 11.5 to about 27.2 MPa (1667 to 3942 psi) and a decreased operating pressure in zones 5 and 6.

If used, a physical blowing agent (PBA), carbon dioxide ($CO_2$), was injected into extruder 14 between zones 5 and 6, between two blister rings on the screw, by laboratory injection system 16 available as Model 567 from Sencorp Systems Inc., Hyannis, Mass. The carbon dioxide injection rates were controlled to a concentration of about 1.6 weight % of the total polymer flowrate by injecting the carbon dioxide at a flowrate of about 0.23 kg/hr (0.5 lb/hr).

The polymer and blowing agent mixture was mixed to form a melt mixture. This melt mixture containing polymer and blowing agent was conveyed through 25 mm diameter transfer pipe 18 to second single screw extruder 20, an 89 mm diameter (3.5") NRM Davis-Standard single screw extruder. Extruder 20 had 6 zones, a length to diameter ratio of 30:1, and a screw having distributive mixing elements along substantially the entire length of the screw, available as Model SFS-43 from Plastic Engineering Associates, Inc. Extruder 20 was operated at 5 RPM with a decreasing temperature profile from zone 1 to zone 6 typically wherein the temperature of zone 1 was about 204° C. (although for some examples the temperature was about 182° C.) and the melt mixture reached a melt temperature (Tm) of about 173°

C. (although for some examples the melt temperature was about 144° C.) as measured with a probe in zone 6. The melt pressure (Pm) of the carbon dioxide entering extruder 14 from injection system 16 was adjusted to maintain the desired carbon dioxide concentration as the downstream pressures in extruder 20 changed. The pressure in extruder 20 was maintained at a level that would prevent nucleation of the carbon dioxide until the melt solution exited die 22. The melt pressure was between about 10 and about 15 MPa. The flow rate of the B layer material was varied from about 13.9 to about 21.0 kg/hr.

To form the A layers, polymeric material was fed into extruder 24, a 32 mm (1.25 in.) Killion Single Screw Extruder (Pawcatuck, Conn., Model KTS 125) with a length to diameter ratio of 24:1, and 3 barrel zones. The screw had a Saxton mixing element with a compression ratio of 3:1. The RPM of extruder 24 (0, 30, 50, and 70 RPM) controlled the polymer flow rates. Extruder 24 had an increasing temperature profile from zone 1 to zone 3 of about 138 to about 216° C. The flow rate of the A layers were between 0 and 7.1 kg/hr.

The materials for both the A and B layers were conveyed from their respective extruders through a 1.27 cm (0.5 in.) OD stainless steel tubing to multilayer feedblock 26, a three layer Cloeren feedblock (Cloeren Company, Orange, Tex., Model 96-1501) with an ABA selector plug.

After the layers were combined in the feedblock the polymeric materials were formed into a planar sheet using a 10" (25.4 cm) wide EDI Ultraflex 40 Drop Die (Extrusion Dies Incorporated, Chippawa Falls, Wis.). The die gap was set at about 510 μm. Feedblock 26 and die 22 were both operated at temperatures of about 182° C. The sheets of polymeric material was cast from die 22 onto temperature-controlled stainless steel casting drum 28, maintained at about 7° C., as a flat film shape and collected at speeds between about 3.0 to about 18.3 m/m.

As the polymeric materials exited die 22 and were exposed to atmospheric pressure of approximately 0.104 MPa (15 psi) the carbon dioxide expanded and nucleation and cell growth occurred, forming foamed material 30. The foamed material was collected on winder 34.

The thickness of the A layers at the die exit was varied by changing the screw RPM of extruder 24. The final thicknesses of the A layers were typically further changed by changing the speed of casting drum 28. When applied, the A layer typically had a nominal thickness at the die exit of 25 or 51 micrometers. This initial barrier layer thickness was then changed, in most cases, by the casting drum speed.

Foamed material 30 optionally could have been passed through nip roll 32.

Thirteen layer constructions were also made in an $(AB)_6A$ arrangement by replacing feedblock 26 with a feedblock having a flow channel multiplier function capable of splitting and recombining flow streams to form the desired multilayer configuration. This latter feedblock is described in U.S. Pat. No. 4,908,278 (Bland et al.), hereby incorporated by reference. The die gap was set at about 510 μm.

Comparative Example 1

The foam articles of this example were made with a foamable layer having a gas concentration of about 47.4 volume percent.

For this example both the A and B layers of the ABA foam articles comprised a low density polyethylene (Tenite LDPE1550P, Eastman Chemical Co., Kingsport, Tenn.). The A layers had 2 weight % of a blue dye (50 wt % dye in a LDPE carrier, C. B. Edwards, Minneapolis, Minn.) added to the polymer to aid foam structure analysis. Samples were made with different A layer thicknesses (but both A layers on an individual sample had the same thickness). The thicknesses of the unfoamed A layers were controlled by varying the screw RPM of extruder 24 and the speed of casting drum 28. The foam layer (B layer) was produced using 2 wt % of a chemical blowing agent (per 100 wt % B layer polymer) comprising 50 wt % sodium bicarbonate/citric acid in a LDPE carrier (RIC-50, Reedy Chemical Company, Keyport, N.J.). The melt temperature of the polymer in zone 6 of extruder 20 was about 173° C. The volume of gas in the foamable B layer, the final thickness of the A layers, and the density and thickness of the total film construction were calculated or measured. Operating conditions and test results are shown in Table 1. Flowrate refers to the total flowrate of the A and B layers. Tm and Pm refer to the temperature and pressure in zone 6 of extruder 20. The A layer Final Thickness was made by measuring the final material.

Figure 2:
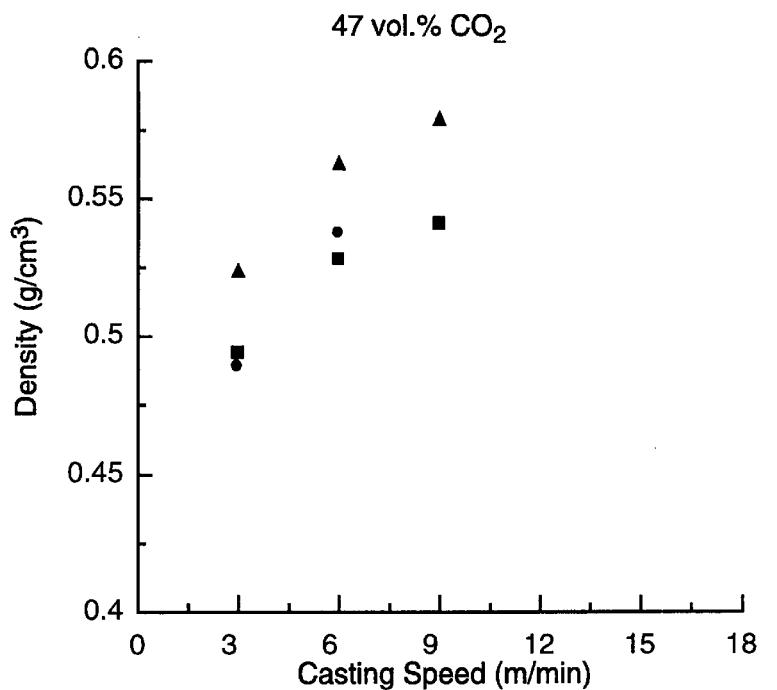
FIG. 2 shows foam density as a function of casting speed for comparative ABA foam articles having different barrier layer thicknesses wherein the barrier and foam layers both comprise a low density polyethylene. The foam layers were made using a fugitive gas concentration of 47.4 vol % $CO_2$ at Standard Temperature and Pressure (STP). A difference in barrier layer thickness is indicated by the different revolutions per minute (RPM) of the barrier layer extruder screw.

As the data in Table 1 show, for these ABA foam articles made with a 47.4 vol. % $CO_2$ fugitive gas concentration in the B layer, at a given casting speed, density increased (or stayed the same) as barrier layer thickness increased. The data in Table 1 is shown graphically in FIG. 2.

TABLE 1

| | B Layer | | | | | A Layer | | | Final Material | | |
|---|---|---|---|---|---|---|---|---|---|---|---|
| | | | | | | | | Final | | Casting | Total |
| Example | RIC-50 wt % | $CO_2$ wt % | $T_m$ ° C. | $P_m$ MPa | Gas vol % | Mat'l | RPM | Thickness μm | Flowrate kg/hr | Speed m/min | Density g/cm³ | Thickness μm |
| 1A | 2.0 | none | 173 | 13.9 | 47.4 | none | 0 | 0 | 13.9 | 3.0 | 0.49 | 780 |
| 1B | 2.0 | none | 173 | 13.9 | 47.4 | none | 0 | 0 | 13.9 | 6.1 | 0.54 | 380 |
| 1C | 2.0 | none | 173 | 13.9 | 47.4 | none | 0 | 0 | 13.9 | 9.1 | 0.55 | 260 |
| 1D | 2.0 | none | 174 | 14.4 | 47.4 | LDPE | 30 | 28.2 | 16.3 | 3.0 | 0.49 | 850 |
| 1E | 2.0 | none | 174 | 14.4 | 47.4 | LDPE | 30 | 14.1 | 16.3 | 6.1 | 0.53 | 400 |
| 1F | 2.0 | none | 174 | 14.4 | 47.4 | LDPE | 30 | 9.4 | 16.3 | 9.1 | 0.54 | 270 |
| 1G | 2.0 | none | 174 | 14.6 | 47.4 | LDPE | 50 | 58.6 | 18.8 | 3.0 | 0.52 | 360 |
| 1H | 2.0 | none | 174 | 14.6 | 47.4 | LDPE | 50 | 29.3 | 18.8 | 6.1 | 0.56 | 810 |
| 1I | 2.0 | none | 174 | 14.6 | 47.4 | LDPE | 50 | 19.5 | 18.8 | 9.1 | 0.58 | 790 |

Comparative Example 2

The foam articles of this example were made with a foamable layer having a gas concentration of about 64.3 volume percent.

The foam articles of Comparative Example 2 were made in the same manner as those in Comparative Example 1 except that 4 wt % RIC-50 was used, and the screw RPM of extruder 24 and the speed of casting drum 28 were different. Operating conditions and test results are shown in Table 2.

As the data in Table 2 shows, for these ABA foam articles made with a 64.3 vol. % $CO_2$ fugitive gas concentration in the B layer, at a given casting speed, density increased as barrier layer thickness increased.

Example 4

The foam articles of this example were made with a foamable layer having a gas concentration of about 90.0 volume percent.

The foam articles of Example 4 were made in the same manner as those in Comparative Example 1 except that a combination of 1.6 wt % carbon dioxide and 2 wt % RIC-50 were used as blowing agents, and the screw RPM of extruder 24 and the speed of casting drum 28 were different. The carbon dioxide gas (99.9 %, Oxygen Services, St. Paul,

TABLE 2

| | B Layer | | | | | A Layer | | Final Material | | | |
|---|---|---|---|---|---|---|---|---|---|---|---|
| | | | | | | | | Final | Casting | | Total |
| Example | RIC-50 wt % | $CO_2$ wt % | $T_m$ °C. | $P_m$ MPa | Gas vol % | Mat'l | RPM | Thickness $\mu$m | Flowrate kg/hr | Speed m/min | Density g/cm$^3$ | Thickness $\mu$m |
| 2A | 4.0 | none | 174 | 13.9 | 64.3 | LDPE | 30 | 28.2 | 14.6 | 3.0 | 0.37 | 1260 |
| 2B | 4.0 | none | 174 | 13.9 | 64.3 | LDPE | 30 | 14.1 | 14.6 | 6.1 | 0.39 | 590 |
| 2C | 4.0 | none | 174 | 13.9 | 64.3 | LDPE | 30 | 9.4 | 14.6 | 9.1 | 0.41 | 370 |
| 2D | 4.0 | none | 174 | 13.9 | 64.3 | LDPE | 70 | 56.2 | 14.6 | 3.0 | 0.39 | 930 |
| 2E | 4.0 | none | 174 | 13.9 | 64.3 | LDPE | 70 | 42.1 | 14.6 | 6.1 | 0.41 | 640 |
| 2F | 4.0 | none | 174 | 13.9 | 64.3 | LDPE | 70 | 28.1 | 14.6 | 9.1 | 0.44 | 420 |

Example 3

The foam articles of this example were made with a foamable layer having a gas concentration of about 73.0 volume percent.

The foam articles of Example 3 were made and tested in the same manner as those in Comparative Example 1 except that 6 wt % RIC-50 was used as a blowing agent, and the screw RPM of extruder 24 and the line speed were different. Operating conditions and test results are shown in Table 3.

Figure 3:
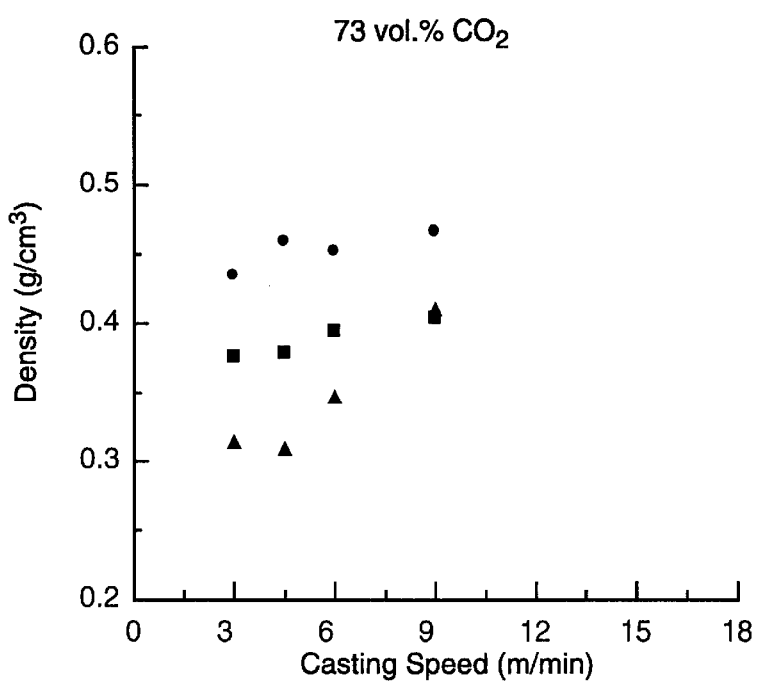
FIG. 3 shows foam density as a function of casting speed for ABA foam articles having different barrier layer thicknesses wherein the barrier layer and foam layers both comprise a low density polyethylene and the foam layers were made using a fugitive gas concentration of 73.0 vol % of $CO_2$ at STP. A difference in barrier layer thickness is indicated by the different revolutions per minute (RPM) of the barrier layer extruder screw.

Surprisingly, the data in Table 3 show that, for these ABA foam articles made with a 73.0 % vol. $CO_2$ fugitive gas concentration in the B layer, at a given casting speed, density decreased as barrier layer thickness increased. The data in Table 3 are shown graphically in FIG. 3.

Minn.) was introduced into extruder 14 at 0.23 kg/hr (0.5 lb/hr). Operating conditions and test results are shown in Table 4.

As the data in Table 4 show, for these ABA foam articles made with a 90.0 % vol. $CO_2$ fugitive gas concentration in the B layer, at a given casting speed, as barrier layer thickness increased foam density decreased by between 5 and 60%. For example, comparison of Examples 4A and 4I shows that adding a barrier layer having a final thickness of 84.3 $\mu$m decreased foam density by almost 60%. The data in Table 4 are shown graphically in FIG. 5.

These data demonstrate one aspect of the invention by showing that at high blowing agent concentrations, increasing the barrier layer thicknesses caused density to significantly decrease as compared to a foam article made with no, or thinner, barrier layers.

TABLE 3

| | B Layer | | | | | A Layer | | Final Material | | | |
|---|---|---|---|---|---|---|---|---|---|---|---|
| | | | | | | | | Final | Casting | | Total |
| Example | RIC-50 Wt % | $CO_2$ wt % | $T_m$ °C. | $P_m$ MPa | Gas vol % | Mat'l | RPM | Thickness $\mu$m | Flowrate kg/hr | Speed m/min | Density g/cm$^3$ | Thickness $\mu$m |
| 3A | 6.0 | none | 173 | 14.9 | 73.0 | None | 0 | 0 | 13.9 | 3.0 | 0.43 | 830 |
| 3B | 6.0 | none | 173 | 14.9 | 73.0 | None | 0 | 0 | 13.9 | 4.6 | 0.46 | 690 |
| 3C | 6.0 | none | 173 | 14.9 | 73.0 | None | 0 | 0 | 13.9 | 6.1 | 0.45 | 550 |
| 3D | 6.0 | none | 173 | 14.9 | 73.0 | None | 0 | 0 | 13.9 | 9.1 | 0.47 | 420 |
| 3E | 6.0 | none | 173 | 14.9 | 73.0 | LDPE | 30 | 28.2 | 16.3 | 3.0 | 0.38 | 1300 |
| 3F | 6.0 | none | 173 | 14.9 | 73.0 | LDPE | 30 | 18.8 | 16.3 | 4.6 | 0.38 | 970 |
| 3G | 6.0 | none | 173 | 14.9 | 73.0 | LDPE | 30 | 14.1 | 16.3 | 6.1 | 0.39 | 710 |
| 3H | 6.0 | none | 173 | 14.9 | 73.0 | LDPE | 30 | 9.4 | 16.3 | 9.1 | 0.40 | 470 |
| 3I | 6.0 | none | 173 | 14.9 | 73.0 | LDPE | 70 | 84.3 | 21.0 | 3.0 | 0.31 | 2000 |
| 3J | 6.0 | none | 173 | 14.9 | 73.0 | LDPE | 70 | 56.2 | 21.0 | 4.6 | 0.31 | 1400 |
| 3K | 6.0 | none | 173 | 14.9 | 73.0 | LDPE | 70 | 42.1 | 21.0 | 6.1 | 0.35 | 950 |
| 3L | 6.0 | none | 173 | 14.9 | 73.0 | LDPE | 70 | 28.1 | 21.0 | 9.1 | 0.41 | 590 |

TABLE 4

| Example | B Layer | | | | | A Layer | | | Final Material | | | Total |
|---|---|---|---|---|---|---|---|---|---|---|---|---|
| | RIC-50 wt % | $CO_2$ wt % | $T_m$ °C. | $P_m$ MPa | Gas vol % | Mat'l | RPM | Thick $\mu m$ | Flowrate kg/hr | Casting Speed m/min | Density g/cm³ | Thickness $\mu m$ |
| 4A | 2.0 | 1.6 | 173 | 14.9 | 90.0 | None | 0 | 0 | 13.9 | 3.0 | 0.57 | 970 |
| 4B | 2.0 | 1.6 | 173 | 14.9 | 90.0 | None | 0 | 0 | 13.9 | 4.6 | 0.53 | 670 |
| 4C | 2.0 | 1.6 | 173 | 14.9 | 90.0 | None | 0 | 0 | 13.9 | 6.1 | 0.50 | 540 |
| 4D | 2.0 | 1.6 | 173 | 14.9 | 90.0 | None | 0 | 0 | 13.9 | 9.1 | 0.48 | 390 |
| 4E | 2.0 | 1.6 | 173 | 14.9 | 90.0 | LDPE | 30 | 28.2 | 13.9 | 3.0 | 0.54 | 1160 |
| 4F | 2.0 | 1.6 | 173 | 14.9 | 90.0 | LDPE | 30 | 18.8 | 16.3 | 4.6 | 0.48 | 810 |
| 4G | 2.0 | 1.6 | 173 | 14.9 | 90.0 | LDPE | 30 | 14.1 | 16.3 | 6.1 | 0.44 | 620 |
| 4H | 2.0 | 1.6 | 173 | 14.9 | 90.0 | LDPE | 30 | 9.4 | 16.3 | 9.1 | 0.41 | 430 |
| 4I | 2.0 | 1.6 | 173 | 14.9 | 90.0 | LDPE | 70 | 84.3 | 21.0 | 3.0 | 0.23 | 2150 |
| 4J | 2.0 | 1.6 | 173 | 14.9 | 90.0 | LDPE | 70 | 56.2 | 21.0 | 4.6 | 0.24 | 1660 |
| 4K | 2.0 | 1.6 | 173 | 14.9 | 90.0 | LDPE | 70 | 42.1 | 21.0 | 6.1 | 0.24 | 1250 |
| 4L | 2.0 | 1.6 | 173 | 14.9 | 90.0 | LDPE | 70 | 28.1 | 21.0 | 9.1 | 0.22 | 750 |

Comparative Example 5

The foam articles of this example were made with barrier layers comprising a pressure sensitive adhesive KRATON available as HL2642X from H. B. Fuller, St. Paul, Minn., and a foamable layer having a gas volume concentrations of 47.4 vol. %.

The foam articles of Comparative Example 5 were made in the same manner as those in Comparative Example 1 except that a different barrier layer composition was used. The blowing agent used was 2.0 weight % RIC-50. Operating conditions and test results are shown in Table 5. Data for Comparative Examples 1A, 1B, and 1C are also shown in Table 5 for comparative purposes.

As the data in Table 5 shows, for this ABA foam made with a 47.4 vol. % $CO_2$ fugitive gas concentration in the B layer, at a given casting speed, density stayed relatively constant as barrier layer thickness increased.

Example 6

The foam articles of this example were made with barrier layers comprising a pressure sensitive adhesive KRATON available as HL2642X from H. B. Fuller, St. Paul, Minn., and a foamable layer having a gas volume concentrations of 90 vol. %.

The foam articles of Example 6 were made in the same manner as those in Comparative Example 5 except that a different blowing agent formulation was used. The blowing agent used was 2 weight % RIC-50 and 1.6 weight % $CO_2$. Operating conditions and test results are shown in Table 6. Some of the data in Table 6 are shown in FIG. 6. Data for Examples 4B, 4C, and 4D, which were made using a similar gas volume percent are also shown in Table 6 for comparative purposes.

As the data in Table 6 shows, for these ABA foam articles made with a 90.0 % vol. $CO_2$ fugitive gas concentration in the B layer, at a given casting speed, foam density decreased as barrier layer thickness increased. For example, as shown

TABLE 5

| Example | B Layer | | | | | A Layer | | Final Thickness $\mu m$ | Total | | | Total |
|---|---|---|---|---|---|---|---|---|---|---|---|---|
| | RIC-50 wt % | $CO_2$ wt % | $T_m$ °C. | $P_m$ MPa | Gas vol % | Mat'l | RPM | | Flowrate kg/hr | Speed m/m | Density g/cm³ | Thickness $\mu m$ |
| 1A | 2.0 | none | 173 | 13.9 | 47.4 | none | 0 | 0 | 13.9 | 3.0 | 0.49 | 780 |
| 1B | 2.0 | none | 173 | 13.9 | 47.4 | none | 0 | 0 | 13.9 | 6.1 | 0.54 | 380 |
| 1C | 2.0 | none | 173 | 13.9 | 47.4 | none | 0 | 0 | 13.9 | 9.1 | 0.55 | 260 |
| 5A | 2.0 | none | 173 | 11.5 | 47.4 | PSA | 15 | 14.1 | 15.1 | 3.0 | 0.53 | 780 |
| 5B | 2.0 | none | 173 | 11.5 | 47.4 | PSA | 15 | 7.1 | 15.1 | 6.1 | 0.58 | 370 |
| 5C | 2.0 | none | 173 | 11.5 | 47.4 | PSA | 15 | 4.7 | 15.1 | 9.1 | 0.59 | 240 |
| 5D | 2.0 | none | 173 | 11.5 | 47.4 | PSA | 30 | 28.2 | 16.3 | 3.0 | 0.53 | 860 |
| 5E | 2.0 | none | 173 | 11.5 | 47.4 | PSA | 30 | 14.1 | 16.3 | 6.1 | 0.57 | 410 |
| 5F | 2.0 | none | 173 | 11.5 | 47.4 | PSA | 30 | 9.4 | 16.3 | 9.1 | 0.60 | 260 |
| 5G | 2.0 | none | 173 | 11.5 | 47.4 | PSA | 70 | 56.2 | 21.0 | 4.6 | 0.55 | 660 |
| 5H | 2.0 | none | 173 | 11.5 | 47.4 | PSA | 70 | 42.1 | 21.0 | 6.1 | 0.57 | 480 |
| 5I | 2.0 | none | 173 | 11.5 | 47.4 | PSA | 70 | 28.1 | 21.0 | 9.1 | 0.59 | 310 | by comparing 4D and 6F, increasing the RPM of the extruder screw for the unfoamed barrier layer from 0 to 70 decreased the density of the foam construction made at a line speed of 9.1 m/min from 0.48 to 0.26 g/cm³, respectively.

TABLE 6

| | B Layer | | | | | A Layer | | Final Material | | | |
| | | | | | | | | Final | Casting | | Total |
| | RIC-50 wt % | $CO_2$ wt % | $T_m$ °C. | $P_m$ MPa | Gas vol % | Mat'l | RPM | Thickness $\mu$m | Flowrate kg/hr | Speed m/min | Density g/cm$^3$ | Thickness $\mu$m |
|---|---|---|---|---|---|---|---|---|---|---|---|---|
| 4B | 2.0 | 1.6 | 173 | 14.9 | 90.0 | None | 0 | 0 | 13.9 | 4.6 | 0.53 | 670 |
| 4C | 2.0 | 1.6 | 173 | 14.9 | 90.0 | None | 0 | 0 | 13.9 | 6.1 | 0.50 | 540 |
| 4D | 2.0 | 1.6 | 173 | 14.9 | 90.0 | None | 0 | 0 | 13.9 | 9.1 | 0.48 | 390 |
| 6A | 2.0 | 1.6 | 173 | 11.5 | 91.6 | PSA | 30 | 18.8 | 16.3 | 4.6 | 0.34 | 900 |
| 6B | 2.0 | 1.6 | 173 | 11.5 | 91.6 | PSA | 30 | 14.1 | 16.3 | 6.1 | 0.29 | 690 |
| 6C | 2.0 | 1.6 | 173 | 11.5 | 91.6 | PSA | 30 | 9.4 | 16.3 | 9.1 | 0.34 | 430 |
| 6D | 2.0 | 1.6 | 173 | 11.5 | 91.6 | PSA | 70 | 56.2 | 21.0 | 4.6 | 0.27 | 1300 |
| 6E | 2.0 | 1.6 | 173 | 11.5 | 91.6 | PSA | 70 | 42.1 | 21.0 | 6.1 | 0.26 | 940 |
| 6F | 2.0 | 1.6 | 173 | 11.5 | 91.6 | PSA | 70 | 28.1 | 21.0 | 9.1 | 0.26 | 590 |

Example 7

Table 7 reports measured mechanical properties of some of the foam articles described in the previous examples (as identified in Table 7). The tensile strength of the samples at failure is reported in Table 7.

Some of the data in Table 7 are shown in FIG. 7. FIG. 7, shows the normalized tensile strength (N Tensile) as a function of the normalized density (N Density) for foam articles made with LDPE1550 foamable layers having fugitive gas concentrations of 47.4 vol. % (from 2 wt % RIC-50), 64.3 vol. % (from 4 wt % RIC-50), 73.0 vol. % (from 4 wt % RIC-50), and 90.0 vol. % (from 1.6 wt % carbon dioxide with 2 wt % RIC-50), unfoamed barrier layers applied with the extruder screw set at 0 to 70 RPM, and casting drum speeds of about 6.1 m/min. The solid line in FIG. 7 represents the density-to-strength relationship of typical polymer foam articles as taught in Gibson, L. J. and Ashby, M. F., *Cellular Solids*, pp. 175–234, Cambridge University Press, 1997. As seen, the LDPE foam articles of the present invention made with 73.0 vol. % and 90 vol. % $CO_2$ fugitive gas have a nearly zero-angle slope indicating that the tensile strengths of these foam articles are substantially independent of density.

TABLE 7

| | B Layer | | | A Layer | | Final Material | | | | |
| | | | | Final | Casting | | | | | |
| Example | RIC-50 wt % | $CO_2$ wt % | RPM | Thickness micron | Speed m/min | Tensile MPa (psi) | Elongation % | N Tensile | Density g/cm$^3$ | N Density |
|---|---|---|---|---|---|---|---|---|---|---|
| 1A | 2.0 | none | 0 | 0 | 3.0 | 5.78 (839) | 580 | 0.56 | 0.49 | 0.53 |
| 1C | 2.0 | none | 0 | 0 | 6.1 | 6.21 (901) | 395 | 0.60 | 0.54 | 0.58 |
| 1D | 2.0 | none | 0 | 0 | 9.1 | 6.25 (907) | 167 | 0.60 | 0.55 | 0.61 |
| 1F | 2.0 | none | 0 | 0 | 15.2 | 6.83 (990) | 93 | 0.66 | 0.57 | 0.62 |
| 1H | 2.0 | none | 30 | 28.2 | 3.0 | 6.60 (957) | 645 | 0.64 | 0.49 | 0.54 |
| 1I | 2.0 | none | 30 | 14.1 | 6.1 | 7.80 (1132) | 520 | 0.75 | 0.53 | 0.57 |
| 1J | 2.0 | none | 30 | 9.4 | 9.1 | 8.20 (1189) | 383 | 0.79 | 0.54 | 0.59 |
| 1L | 2.0 | none | 50 | 29.3 | 6.1 | 8.47 (1229) | 552 | 0.82 | 0.56 | 0.61 |
| 2B | 4.0 | none | 30 | 14.1 | 6.1 | 4.01 (582) | 315 | 0.39 | 0.39 | 0.42 |
| 2E | 4.0 | none | 70 | 42.1 | 6.1 | 4.95 (718) | 481 | 0.48 | 0.41 | 0.45 |
| 3C | 6.0 | none | 0 | 0 | 6.1 | 3.00 (435) | 131 | 0.29 | 0.45 | 0.49 |
| 3H | 6.0 | none | 30 | 14.1 | 6.1 | 2.71 (393) | 130 | 0.26 | 0.39 | 0.43 |
| 3L | 6.0 | none | 70 | 42.1 | 6.1 | 2.59 (376) | 220 | 0.25 | 0.35 | 0.38 |
| 4C | 2.0 | 1.6 | 0 | 0 | 6.1 | 2.90 (420) | 86 | 0.28 | 0.50 | 0.55 |
| 4G | 2.0 | 1.6 | 30 | 14.1 | 6.1 | 3.03 (440) | 162 | 0.29 | 0.44 | 0.48 |
| 4K | 2.0 | 1.6 | 70 | 42.1 | 6.1 | 2.65 (385) | 338 | 0.26 | 0.24 | 0.26 |
| 4M | 2.0 | 1.6 | 70 | 21.1 | 12.2 | 2.85 (413) | 260 | — | 0.24 | — |

Comparative Example 8

The foam articles of this example had 13 layers and were made with foamable layers having a 47.4 vol. % fugitive gas concentration.

The foam articles of Comparative Example 8 were made in the same manner as those in Comparative Example 1 except that a multi-layer feedblock was used to form a thirteen layer (AB)$_6$A construction and the screw RPM of extruder 24 and the speed of casting drum 28 were different. Operating conditions and test results are shown in Table 8.

As the data in Table 8 show, for these 13 layer foam articles made with a 47.4 vol. % $CO_2$ fugitive gas concentration in the B layers, at a given casting speed, as the thickness of the unfoamed A layers of the film construction increased, the density of the samples increased in a manner similar to that of Comparative Example 1.

TABLE 8

| | B Layers | | | | | A Layers | | Final Thickness μm | Final Material | | | |
|---|---|---|---|---|---|---|---|---|---|---|---|---|
| | | | | | | | | | | Casting | | Total |
| Example | RIC-50 wt % | $CO_2$ wt % | $T_m$ °C. | $P_m$ MPa | Gas vol % | Mat'l | RPM | | Flowrate kg/hr | Speed m/min | Density g/cm$^3$ | Thickness μm |
| 8A | 2.0 | none | 173 | 20.7 | 47.4 | None | 0 | 0 | 11.6 | 3.0 | 0.50 | 1030 |
| 8B | 2.0 | none | 173 | 20.7 | 47.4 | None | 0 | 0 | 11.6 | 6.1 | 0.52 | 340 |
| 8C | 2.0 | none | 173 | 20.7 | 47.4 | None | 0 | 0 | 11.6 | 9.1 | 0.54 | 230 |
| 8D | 2.0 | none | 173 | 20.7 | 47.4 | LDPE | 30 | 9.3 | 14.3 | 3.0 | 0.53 | 1200 |
| 8E | 2.0 | none | 173 | 20.7 | 47.4 | LDPE | 30 | 4.7 | 14.3 | 6.1 | 0.55 | 360 |
| 8F | 2.0 | none | 173 | 20.7 | 47.4 | LDPE | 30 | 3.1 | 14.3 | 9.1 | 0.56 | 250 |
| 8G | 2.0 | none | 173 | 20.7 | 47.4 | LDPE | 70 | 22.5 | 18.2 | 3.0 | 0.57 | 1350 |
| 8H | 2.0 | none | 173 | 20.7 | 47.4 | LDPE | 70 | 11.2 | 18.2 | 6.1 | 0.58 | 430 |
| 8I | 2.0 | none | 173 | 20.7 | 47.4 | LDPE | 70 | 7.5 | 18.2 | 9.1 | 0.60 | 280 |

Example 9

The foam articles of this example had 13 layers and were made with a foamable layer having a 73.0 vol. % fugitive gas concentration.

The foams of Example 9 were made in the same manner as those in Comparative Example 8 except that 6 wt % RIC-50 was used as a blowing agent instead of 2 wt % RIC-50. Operating conditions and test results are shown in Table 9. Data for Examples 3A, 3C, and 3D are also shown in Table 9 for comparative purposes.

As the data in Table 9 show, for these 13 layer foam articles made with a 73.0 vol. % $CO_2$ fugitive gas concentration in the B layers, at a given casting speed, even at a thickness greater than that of a similar single layer foam article with no unfoamed A layers, the density of the multilayer sample was lower than that of the single foam layer.

Example 10

The foam articles of this example had 13 layers and were made with a foamable layer having a 91.5 vol. % fugitive gas concentration.

The foam articles of Example 10 were made in a manner similar to those in Comparative Example 8 except that a combination of 2 wt % RIC-50 and 1.6 wt % carbon dioxide was used as blowing agents, the melt temperature of the foamable mixture was changed, and the screw RPM of extruder 24 and speed of casting drum 28 were different. The melt temperature of the polymer solution in zone 6 of extruder 20 was about 144° C. Operating conditions and test results are shown in Table 10. Data for Example 4A are also shown in Table 10 for comparative purposes.

The data in Table 10 show that for these 13 layer foam articles made with a 91.5 vol. % $CO_2$ fugitive gas concentration in the B layers, at a given casting speed, even at a thickness greater than that of a similar single layer foam article with no unfoamed A layers, the density of the multilayer sample was lower than that of the single foam layer.

TABLE 9

| | B Layers | | | | | A Layers | | Final Thickness μm | Final Material | | | |
|---|---|---|---|---|---|---|---|---|---|---|---|---|
| | | | | | | | | | | Casting | | Total |
| Example | RIC-50 wt % | $CO_2$ wt % | $T_m$ °C. | $P_m$ MPa | Gas vol % | Mat'l | RPM | | Flowrate kg/hr | Speed m/min | Density g/cm$^3$ | Thickness μm |
| 3A | 6.0 | none | 173 | 14.9 | 73.0 | None | 0 | 0 | 13.9 | 3.0 | 0.43 | 830 |
| 3C | 6.0 | none | 173 | 14.9 | 73.0 | None | 0 | 0 | 13.9 | 6.1 | 0.45 | 550 |
| 3D | 6.0 | none | 173 | 14.9 | 73.0 | None | 0 | 0 | 13.9 | 9.1 | 0.47 | 420 |
| 9D | 6.0 | none | 173 | 20.7 | 73.0 | LDPE | 30 | 9.3 | 14.3 | 3.0 | 0.40 | 1130 |
| 9E | 6.0 | none | 173 | 20.7 | 73.0 | LDPE | 30 | 4.7 | 14.3 | 6.1 | 0.45 | 650 |
| 9F | 6.0 | none | 173 | 20.7 | 73.0 | LDPE | 30 | 3.1 | 14.3 | 9.1 | 0.52 | 420 |
| 9G | 6.0 | none | 173 | 20.7 | 73.0 | LDPE | 70 | 22.5 | 18.2 | 3.0 | 0.37 | 1380 |
| 9H | 6.0 | none | 173 | 20.7 | 73.0 | LDPE | 70 | 11.2 | 18.2 | 6.1 | 0.40 | 900 |
| 9I | 6.0 | none | 173 | 20.7 | 73.0 | LDPE | 70 | 7.5 | 18.2 | 9.1 | 0.48 | 520 |

TABLE 10

| | B Layers | | | | | A Layers | | Final | Final Material | | | Total |
|---|---|---|---|---|---|---|---|---|---|---|---|---|
| Example | RIC-50 wt % | $CO_2$ wt % | $T_m$ °C. | $P_m$ MPa | Gas vol % | Mat'l | RPM | Thickness $\mu$m | Flowrate kg/hr | Speed m/min | Density g/cm³ | Thickness $\mu$m |
| 4A | 2.0 | 1.6 | 173 | 14.9 | 90.0 | None | 0 | 0 | 13.9 | 3.0 | 0.57 | 970 |
| 10C | 2.0 | 1.6 | 144 | 27.2 | 91.5 | LDPE | 30 | 18.6 | 14.3 | 1.5 | 0.31 | 2700 |
| 10D | 2.0 | 1.6 | 144 | 27.2 | 91.5 | LDPE | 30 | 9.3 | 14.3 | 3.0 | 0.29 | 2999 |
| 10E | 2.0 | 1.6 | 144 | 27.2 | 91.5 | LDPE | 70 | 45.0 | 18.2 | 1.5 | 0.31 | 3800 |
| 10F | 2.0 | 1.6 | 144 | 27.2 | 91.5 | LDPE | 70 | 22.5 | 18.2 | 3.0 | 0.31 | 3130 |

Having now described the features, discoveries and principles of the invention, the manner in which the process and apparatus is constructed and used, the characteristics of the construction, and the advantageous, new and useful results obtained, the new and useful structures, devices, elements, arrangements, parts, and combinations, are set forth in the appended claims.

We claim:

1. A method of making a foam article comprising:
   (1) forming a mixture consisting essentially of at least one thermoplastic polymer and at least one blowing agent that is, or that produces, a fugitive gas in an amount greater than about 65 volume percent at Standard Pressure and Temperature per 100 volume percent polymer to form a foamable melt mixture,
   (2) shaping the melt mixture such that it has at least one major surface,
   (3) affixing or creating a barrier layer of nonfoaming material on one or more of said major surfaces, wherein the composition and thickness of the barrier layer inhibits diffusion of the fugitive gas out of the foamable melt mixture, and
   (4) causing the melt mixture to foam, wherein the density of the foam article is at least 20% less than would be the density of a similar foam article made without a barrier layer.

2. The method of claim 1 wherein the shaped melt mixture has two major surfaces and each surface has a barrier layer.

3. The method of claim 2 wherein the barrier layer thicknesses are the same.

4. The method of claim 1 wherein said polymer is a polyolefin.

5. The method of claim 1 wherein the density of the foam layer is further reduced by increasing the thickness of the barrier layer(s).

6. The method of claim 1 wherein the blowing agent is one or both of chemical and physical blowing agents.

7. The method of claim 6 wherein the blowing agent is sodium bicarbonate-citric acid mixture.

8. The method of claim 6 wherein the blowing agent is carbon dioxide.

9. The method of claim 1 wherein for foam articles made with a given volume concentration of fugitive gas the normalized tensile strengths of the resulting foam articles is substantially independent of the normalized densities of the resulting foam articles.

10. The method of claim 1 wherein the shaped melt mixture further comprises at least one interior barrier layer of nonfoaming material.

11. The method of claim 1 wherein the barrier layer is created by quenching the surface of the shaped melt mixture.

12. The method of claim 1 wherein the polymer is polyethylene, the nonfoaming material is polyethylene, and the fugitive gas is carbon dioxide in an amount greater than about 65 volume percent at Standard Pressure and Temperature per 100 volume percent polymer.

13. A method of varying the density of foam articles comprising:
   (1) varying the amount of fugitive gas in a foamable polymer melt mixture, and
   (2) varying one or both of the thickness and composition of a non-foaming barrier layer applied to or created on at least one major surface of the foamable melt mixture while, or after, shaping the melt mixture, to control the difference between the time it takes the fugitive gas to diffuse out of the melt mixture and through the barrier layer into the atmosphere and the time it takes for the fugitive gas to nucleate and expand.

* * * * *

UNITED STATES PATENT AND TRADEMARK OFFICE
CERTIFICATE OF CORRECTION

PATENT NO. : 6,623,674 B1 Page 1 of 2
DATED : September 23, 2003
INVENTOR(S) : Gehlsen, Mark D.

It is certified that error appears in the above-identified patent and that said Letters Patent is hereby corrected as shown below:

Column 3,
Line 52, please delete "failing" and insert in place thereof -- falling --.

Column 6,
Line 38, please delete "sections" and insert in place thereof -- selections --.

Column 7,
Lines 53-54, please delete "(Sf/So/(Pf/Po)" and insert in place thereof -- $(S_f/S_o/P_f/P_o)$ --.

Column 9,
Line 49, please delete "an" following "have".

Column 10,
Line 18, please delete "non-PSA" and insert in place thereof -- non-PSAs --.
Line 23, please delete "produces" and insert in place thereof -- produce --.

Column 12,
Line 67, please delete "(Tm)" and insert in place thereof -- $(T_m)$ --.

Column 13,
Line 3, please delete "(Pm)" and insert in place thereof -- $(P_m)$ --.
Line 30, please delete "Chippawa" and insert in place thereof -- Chippewa --.
Line 32, please delete "sheets" and insert in place thereof -- sheet --.
Line 36, please delete "m/m" and insert in place thereof -- m/min. --.

Column 14,
Line 36, please delete "Tm and Pm" and insert in place thereof -- $T_m$ and $P_m$ --.

Column 17,
Line 26, please delete "concentrations" and insert in place thereof -- concentration --.

UNITED STATES PATENT AND TRADEMARK OFFICE
CERTIFICATE OF CORRECTION

PATENT NO. : 6,623,674 B1
DATED : September 23, 2003
INVENTOR(S) : Gehlsen, Mark D.

It is certified that error appears in the above-identified patent and that said Letters Patent is hereby corrected as shown below:

<u>Column 18,</u>
Line 22, please delete "concentrations" and insert in place thereof -- concentration --.
Table 5, please delete "m/m" and insert in place thereof -- m/min. --.

Signed and Sealed this

Fourteenth Day of September, 2004

JON W. DUDAS
*Director of the United States Patent and Trademark Office*